(12) United States Patent
Hwang et al.

(10) Patent No.: US 9,304,613 B2
(45) Date of Patent: Apr. 5, 2016

(54) MULTIMEDIA DEVICE AND METHOD FOR CONTROLLING OPERATION THEREOF

(75) Inventors: Ho-ik Hwang, Hwaseong-si (KR); Soo-hyun Lee, Seoul (KR); Byeong-cheol Hwang, Seoul (KR); Joon-ho Won, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 63 days.

(21) Appl. No.: 12/972,881

(22) Filed: Dec. 20, 2010

(65) Prior Publication Data

US 2011/0160884 A1 Jun. 30, 2011

(30) Foreign Application Priority Data

Dec. 24, 2009 (KR) .................. 10-2009-0130849

(51) Int. Cl.
| | | |
|---|---|---|
| *G06F 17/00* | (2006.01) | |
| *G06F 3/038* | (2013.01) | |
| *G06F 3/02* | (2006.01) | |
| *G06F 3/023* | (2006.01) | |
| *G06F 3/0346* | (2013.01) | |
| *G11B 27/10* | (2006.01) | |
| *G11B 20/00* | (2006.01) | |

(52) U.S. Cl.
CPC ............... *G06F 3/038* (2013.01); *G06F 3/023* (2013.01); *G06F 3/0219* (2013.01); *G06F 3/0346* (2013.01); *G11B 20/00137* (2013.01); *G11B 27/105* (2013.01)

(58) Field of Classification Search
CPC ......... G06F 3/0338; G06F 2200/1637; H04M 2250/12
USPC ........ 700/94; 726/16; 340/4.4; 715/863–866; 345/156, 157, 158, 162, 169
See application file for complete search history.

(56) References Cited

U.S. PATENT DOCUMENTS

| | | | | |
|---|---|---|---|---|
| 6,888,532 | B2* | 5/2005 | Wong et al. | 345/156 |
| 7,256,767 | B2* | 8/2007 | Wong et al. | 345/158 |
| 7,701,442 | B2* | 4/2010 | Wong et al. | 345/158 |
| 8,103,263 | B2* | 1/2012 | Shim et al. | 455/418 |
| 8,125,461 | B2* | 2/2012 | Weber et al. | 345/173 |
| 8,441,441 | B2* | 5/2013 | Tsai et al. | 345/157 |
| 8,462,109 | B2* | 6/2013 | Nasiri et al. | 345/158 |
| 8,670,002 | B2* | 3/2014 | Kim et al. | 345/658 |
| 2002/0021278 | A1* | 2/2002 | Hinckley et al. | 345/156 |
| 2003/0103038 | A1* | 6/2003 | Wong et al. | 345/158 |
| 2004/0145613 | A1 | 7/2004 | Stavely et al. | |
| 2004/0179042 | A1* | 9/2004 | Bear et al. | 345/840 |
| 2004/0217988 | A1* | 11/2004 | Bear et al. | 345/771 |

(Continued)

FOREIGN PATENT DOCUMENTS

| | | |
|---|---|---|
| CN | 101344817 A | 1/2009 |
| CN | 201365347 Y | 12/2009 |

(Continued)

*Primary Examiner* — Xu Mei
(74) *Attorney, Agent, or Firm* — Jefferson IP Law, LLP

(57) ABSTRACT

A multimedia apparatus and a method for controlling operations thereof are provided. The multimedia apparatus includes an input unit for receiving a selection signal, a sensing unit for sensing disposition of the multimedia apparatus, and a controller for, if the selection signal is input, performing different operations depending on the disposition. Accordingly, various operations of the multimedia apparatus may be controlled by simple manipulation.

16 Claims, 19 Drawing Sheets

(56) References Cited

U.S. PATENT DOCUMENTS

| | | | |
|---|---|---|---|
| 2004/0227731 A1* | 11/2004 | Gould Bear et al. | 345/160 |
| 2004/0257341 A1* | 12/2004 | Bear et al. | 345/157 |
| 2005/0212767 A1* | 9/2005 | Marvit et al. | 345/158 |
| 2005/0212911 A1 | 9/2005 | Marvit et al. | |
| 2005/0216867 A1* | 9/2005 | Marvit et al. | 715/863 |
| 2006/0005156 A1* | 1/2006 | Korpipaa et al. | 717/100 |
| 2006/0111093 A1* | 5/2006 | Shim et al. | 455/418 |
| 2007/0004451 A1* | 1/2007 | Anderson | 455/556.1 |
| 2007/0036348 A1* | 2/2007 | Orr | 379/424 |
| 2007/0174416 A1 | 7/2007 | Waters et al. | |
| 2007/0176898 A1 | 8/2007 | Suh | |
| 2007/0198843 A1* | 8/2007 | Cradick et al. | 713/182 |
| 2008/0001929 A1* | 1/2008 | Wulff | 345/175 |
| 2008/0186287 A1* | 8/2008 | Saila | 345/174 |
| 2008/0254822 A1* | 10/2008 | Tilley | 455/550.1 |
| 2008/0273755 A1* | 11/2008 | Hildreth | 382/103 |
| 2009/0058822 A1* | 3/2009 | Chaudhri | 345/173 |
| 2009/0088204 A1 | 4/2009 | Culbert et al. | |
| 2009/0133499 A1* | 5/2009 | Cato | 73/514.16 |
| 2009/0179854 A1* | 7/2009 | Weber et al. | 345/156 |
| 2009/0197635 A1* | 8/2009 | Kim et al. | 455/550.1 |
| 2009/0209293 A1* | 8/2009 | Louch | 455/566 |
| 2009/0213081 A1* | 8/2009 | Case, Jr. | 345/173 |
| 2009/0227232 A1* | 9/2009 | Matas et al. | 455/411 |
| 2009/0249075 A1* | 10/2009 | De Atley et al. | 713/176 |
| 2009/0256818 A1* | 10/2009 | Noguchi et al. | 345/174 |
| 2009/0262074 A1 | 10/2009 | Nasiri et al. | |
| 2009/0289958 A1* | 11/2009 | Kim et al. | 345/649 |
| 2010/0069115 A1* | 3/2010 | Liu | 455/556.1 |
| 2010/0174421 A1* | 7/2010 | Tsai et al. | 700/302 |
| 2011/0066682 A1* | 3/2011 | Aldunate et al. | 709/204 |
| 2013/0219345 A1* | 8/2013 | Saukko et al. | 715/863 |

FOREIGN PATENT DOCUMENTS

| | | |
|---|---|---|
| JP | 2007-96992 A | 4/2007 |
| KR | 10-2005-0117642 A | 12/2005 |
| KR | 10-2009-0101541 A | 9/2009 |
| KR | 10-0917527 B1 | 9/2009 |
| KR | 10-2009-0025499 A | 11/2009 |

* cited by examiner

FIG. 4B

| No | Action | Interaction |
|---|---|---|
| 1 | Power On/Off | Long Press (More Than 2sec) |
| 2 | Pause / Play | Upwards Direction Double Click / Click |
| 2 | Volume + | Click (Upside) |
| 3 | Volume - | Click (Downside) |
| 4 | Next | One Click (right) |
|  | Next Folder | Double Click (right) |
| 5 | Prev. | One Click (left) |
|  | Prev. Folder | Double Click (left) |
| 7 | Change Play mode (Normal > Shuffle > Fast > Slow) | Shaking |
| 8 | Audio Guide (Song info) | snap (One Shake) |

FIG. 5

| No | LED Effect | | AUI Feedback |
|---|---|---|---|
| | LED | Time and Frequency | |
| Power On/Off | – → ▲▲ → + | Three LEDS are Dimmed Simultaneously for 1sec and Dimmed Out | Samsung Sound On(Only At Cold Booting) / Off(Always) AUI |
| Pause | None | None | Transmit Beep At 1sec Intervals |
| Next song | ▲▲ | One Time (0.5sec) | None |
| Next Folder | ▲▲ | Twice (0.1sec At 0.1sec Intervals) | "Next Folder" |
| Prev. song | ▼▼ | One Time (0.5sec) | None |
| Prev. Folder | ▼▼ | Twice (0.1sec At 0.1sec Intervals) | "Previous Folder" |
| Vol + | + | One Time (0.3sec) | None |
| Vol - | - | One Time (0.3sec) | None |
| Change mode | None | None | Output Audio Feedback Corresponding to Each Mode (Normal mode-Shuffle mode-Fast mode-slow mode) |
| Firmware upgrade / Data Transferring | - → ▲▲ → + | Blinking Sequentially (0.3sec Without Intervals) | None |
| Charging | + | One Time Every 1.5sec (for 1sec) | None |
| Fully Charged | ▲▲ | On | None |
| Low Battery(Step 1) | - | One Time (2sec) | "Low Battery" |
| Low Battery (3sec Before Turn-Off) | - | Blinking Three Times (0.1sec At 0.1sec Intervals) | "Battery is too low, Shutting down" |
| Unsupported file | None | None | "File not supported" |
| No file | None | None | "No file" |
| G-sensor Beauty Recognition Angle | None | None | "Set device angle property" |

MULTIMEDIA DEVICE AND METHOD FOR CONTROLLING OPERATION THEREOF

PRIORITY

This application claims the benefit under 35 U.S.C. §119(a) of a Korean patent application filed in the Korean Intellectual Property Office on Dec. 24, 2009 and assigned Serial No. 10-2009-0130849, the entire disclosure of which is hereby incorporated by reference.

BACKGROUND OF THE INVENTION

1. Field of the Invention

The present invention relates to a multimedia device and a method for controlling operations thereof. More particularly, the present invention relates to a multimedia device which uses various sensors and a method for controlling an operation thereof.

2. Description of the Related Art

Recently, as digital convergence technology is distributed worldwide, a multimedia apparatus having the functions of various apparatuses such as a Moving Pictures Experts Group (MPEG) Audio Layer 3 (MP3) player, a Personal Media Player (PMP), a camera, and a cellular phone has emerged.

However, such a multimedia apparatus that performs various functions together may cause unexpected inconvenience to a user due to its limited battery capacity, limited size, its weight, or difficulty in its manipulation.

Accordingly, there is a need for a multimedia apparatus that performs only an original function of a mobile device such as an MP3 player, a PMP, and the like. In addition, there have been various attempts to make the multimedia apparatus compact and aesthetically attractive through its design so that the multimedia apparatus may also function as a useful accessory and thereby increase its demand in the market.

SUMMARY OF THE INVENTION

An aspect of the present invention is to address at least the above-mentioned problems and/or disadvantages and to provide at least the advantages described below. Accordingly, an aspect of the present invention is to provide a multimedia apparatus which may control various operations through simple manipulation and a method for controlling the operations thereof.

In accordance with an aspect of the present invention, a multimedia apparatus is provided. The apparatus includes an input unit for receiving a user's selection signal, a sensing unit for sensing disposition of the multimedia apparatus, and a controller for, if the selection signal is input, performing different operations depending on the disposition.

In accordance with another aspect of the present invention, a method for controlling an operation of a multimedia apparatus is provided. The method includes receiving a selection signal, sensing disposition of the multimedia apparatus, and, if the selection signal is input, performing different operations depending on the disposition.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIGS. 4A to 4B are views to explain various operations according to an exemplary embodiment of the present invention;

FIG. 5 is a view to explain operations of a display unit and an audio output unit corresponding to various operations of a multimedia apparatus according to an exemplary embodiment of the present invention;

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
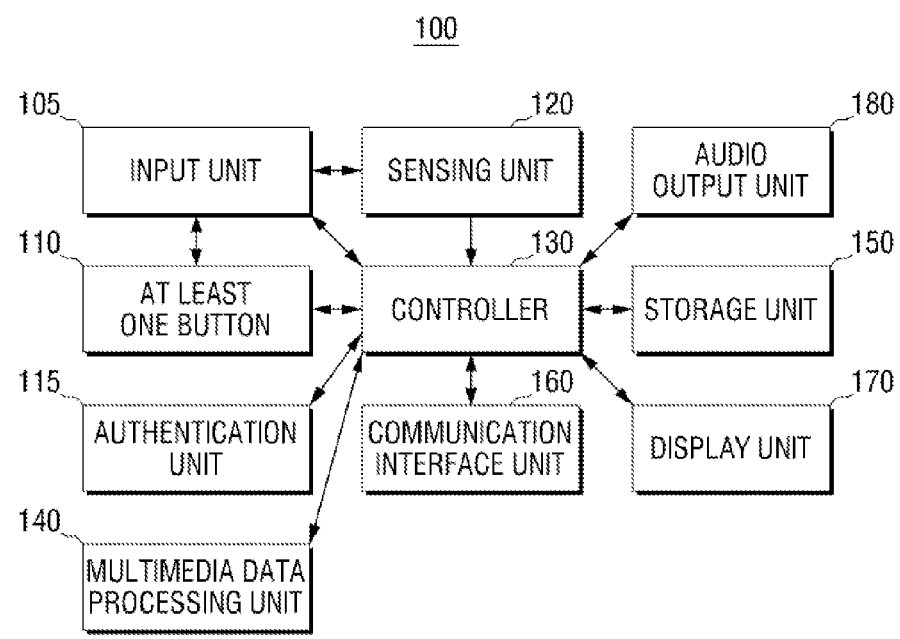
FIG. 1 is a view illustrating a multimedia apparatus according to an exemplary embodiment of the present invention.

FIG. 1 is a view illustrating a multimedia apparatus according to an exemplary embodiment of the present invention.

Referring to FIG. 1, a multimedia apparatus 100 comprises an input unit 105, at least one button 110, an authentication unit 115, a sensor 120, a controller 130, a multimedia data processor 140, a storage unit 150, a communication interface unit 160, a display unit 170, and an audio output unit 180.

The input unit 105 receives a selection signal of a user.

According to an exemplary embodiment, the input unit 105 may receive a selection signal which may include a user's motion of shaking the multimedia apparatus 100. To do so, the input unit 105 may receive a selection signal of the user's motion using various sensors such as a vibration sensor.

In addition, according to an exemplary embodiment, the input unit 105 may receive a user's selection signal through the at least one button 110 disposed in one portion of the multimedia apparatus 100. Specifically, the input unit 105 may receive a selection signal which is the user's motion of pressing the at least one button 110 or touching the at least one button 110. In this case, the at least one button 110 may be embodied as a tactile button or a touch button.

The input unit 105 may also receive a user's selection signal using various sensors such as a temperature sensor, a shock sensor, a pressure sensor, and a finger print sensor.

If the input unit 105 receives a user's selection signal, the authentication unit 115 performs authentication of the user using the user identification information. The user's selection signal may be input to the input unit 105 using a specific part of the user's body, for example, a finger may touch the multimedia apparatus 100. Accordingly, the authentication unit 115 may perform authentication of the user by recognizing (or sensing) the user identification information such as finger print, temperature and body odor. In order to perform such authentication, the user identification information may be pre-stored in the storage unit 150 which will be explained later.

The sensor 120 senses disposition and orientation of the multimedia apparatus 100. In addition, the sensor 120 senses at least one of a change in azimuth angle and a change in gradient of the multimedia apparatus 100. The sensor 120 may include various sensors such as a two-axis sensor, a three-axis sensor, a six-axis sensor, a geomagnetic sensor, and an acceleration sensor. The sensing operation of the sensor 120 will be explained in greater detail with reference to FIG. 3.

The controller 130 performs control operations for the device.

More specifically, if a user's selection signal is input, the controller 130 performs different operations depending on disposition of the multimedia apparatus 100.

The operations performed by the controller 130 may include at least one of controlling the application of power, controlling the executing or stopping of file, controlling the volume, controlling a change in a play list, controlling a play mode, controlling the changing of folder, controlling settings, and the like.

The multimedia data processing unit 140 may perform various processes such as reproducing or displaying multimedia data of various audio files having extensions such as Motion Pictures Experts Group (MPEG) Audio Layer 3 (MP3) and Waveform Audio Format (WAV), various image files having extensions such as Graphics Interchange Format (GIF) and Joint Photographic Group (JPG), or various video files having extensions such as Joint Photographic Experts Group (JPEG), MPEG-4 (MP4), and Audio Video Interleave (AVI).

As illustrated in FIG. 1, the multimedia data processing unit 140 may be included in the controller 130.

The storage unit 150 may store various multimedia data. In this case, the storage unit 150 may include at least one stratified folder. The storage unit 150 may store a play list of multimedia data which is preset by a user. If the storage unit 150 is connected to an external apparatus, the storage unit 150 may store an execution program to install an application for setting or changing various settings of the multimedia apparatus 100 in the external apparatus automatically.

In addition, the storage unit 150 stores information regarding a mapping between disposition of the sensed multimedia apparatus 100 and an operation performed by the controller 130.

Herein, the mapping information represents operation information which is mapped according to each direction of the multimedia apparatus 100, so that the multimedia apparatus 100 may perform different operations depending on each direction of up, down, left, right, front, and back of the multimedia apparatus 100.

The controller 130 may perform various operations as described above using mapping information stored in the storage unit 150.

According to an exemplary embodiment, mapping information regarding basic operations such as playing and stopping is pre-stored in the storage unit 150 when the multimedia apparatus 100 is released and provided to a user. However, if operations corresponding to disposition of the sensed multimedia apparatus 100 have not been set, a user may designate operations corresponding to disposition of the sensed multimedia apparatus 100. For example, the user may designate operations corresponding to disposition of the sensed multimedia apparatus 100 in a control window of an external apparatus (not shown). As such, mapping information may be changed by the user, and the changed mapping information may be stored in the storage unit 150.

The communication interface unit 160 may perform wired or wireless communication with an external apparatus (not shown).

For example, the communication interface unit 160 may have a Universal Serial Bus (USB) interface and perform wired communication with an external apparatus using the USB interface. In addition, the communication interface unit 160 may perform wireless communication with an external apparatus (not shown) through various communication protocols such as Zigbee and Bluetooth.

In an exemplary embodiment, an external apparatus (not shown) may be an earphone that is able to perform wired or wireless communication with the multimedia apparatus 100, or a host PC or a web server that is able to change setting information of the multimedia apparatus 100 and provide updates to various multimedia files.

The communication interface unit 160 may transmit data for an outputting operation, performed by the controller 130, such as audio or video data provided to an earphone that communicates with the multimedia apparatus 100.

Accordingly, the earphone that performs wired/wireless communication with the multimedia apparatus 100 may display an operation being performed on a display screen (not shown) or may notify of an operation being performed as audio through an audio output unit (not shown).

The display unit 170 displays an image file while an audio file is being reproduced, or displays a video file. In addition, the display unit 170 may display information regarding the state of an operation being performed by the controller 130.

The multimedia apparatus 100, according to an exemplary embodiment, may display at least one icon in a Light Emitting Diode (LED) display area for displaying an operation state, may display at least one icon outside of the LED display area, and the LED display area may be the display unit 170.

The audio output unit 180 outputs an operation performed by the controller 130 as audio. The audio output unit 180 may be embodied as an amplifier or a speaker.

The multimedia apparatus 100 may be an audio reproducing apparatus such as an MP3 player, but this is only an example. The multimedia apparatus 100 may be any of various apparatuses which perform various functions along with an audio reproducing function, such as an MP4 player, a Personal Digital Assistant (PDA), a Personal Media Player (PMP), a cellular phone, a navigator, and the like.

According to an exemplary embodiment, the multimedia apparatus 100 may be provided having a small size, thus stimulating the purchasing desire of a user by emphasizing a visual aesthetic sense.

Since the multimedia apparatus 100 has a small size similar to the size of a USB memory, the multimedia apparatus 100 may be provided with multimedia data from an external apparatus like a cellular phone without being connected to a user PC.

Figure 2A:
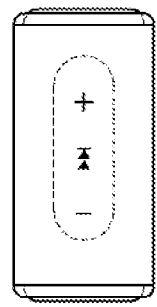
FIGS. 2A to 2C are views to explain a multimedia apparatus according to an exemplary embodiment of the present invention.
Figure 2B:
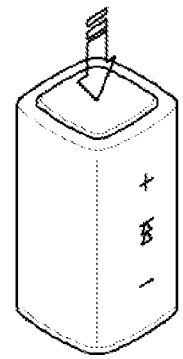
Figure 2C:
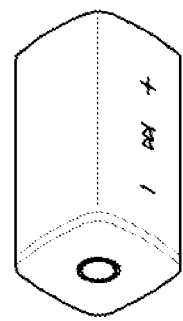

FIGS. 2A to 2C are views to explain a multimedia apparatus according to an exemplary embodiment of the present invention.

Referring to FIG. 2A, a multimedia apparatus may have a shape similar to a six-sided lump sugar, and may include an LED that displays state information in one of the six sides.

Referring to FIG. 2B, a multimedia apparatus may include a single button in one of the six sides, and a user's selection signal may be input to the multimedia apparatus by a motion of pressing or touching the single button.

Referring to FIG. 2C, a multimedia apparatus may include a communication interface unit for connecting an earphone. In an exemplary implementation, the communication interface may be provided on a side facing a side including a single button as illustrated in FIG. 2B.

Referring to FIGS. 2A to 2C, a user's selection signal may be input in an input unit through a single button. Alternatively, a user's selection signal may be input in the input unit through more than two buttons or without a button.

Figure 3:
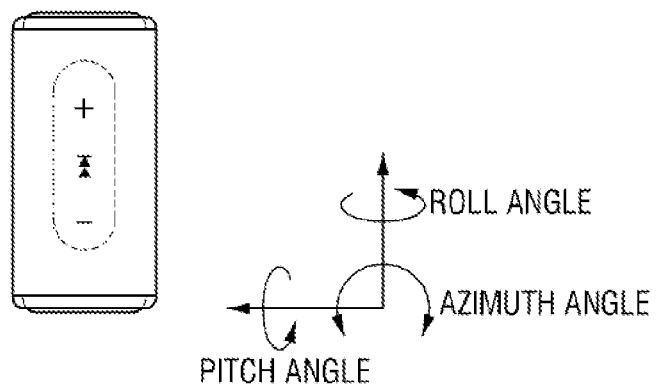
FIG. 3 is a view to explain operation of a sensing unit according to an exemplary embodiment of the present invention.

FIG. 3 is a view to explain operation of a sensing unit according to an exemplary embodiment of the present invention.

Referring to FIG. 3, if a multimedia apparatus is disposed on a flat surface, the pitch angle, roll angle, or azimuth angle of the multimedia apparatus may be respectively changed by the direction of an arrow.

The angle changed in a left or right direction on a flat surface is an azimuth angle (i.e., a yaw angle), and the azimuth angle indicates which direction the multimedia apparatus is headed for.

The angle created as a flat surface is sloped left or right is a roll angle, and the roll angel indicates left or right gradient of the multimedia apparatus.

The angle created as a flat surface is sloped up or down is a pitch angle, and the pitch angle indicates upward or downward gradient of the multimedia apparatus.

The pitch angle, roll angle, or yaw angle may be calculated using a geomagnetic sensor and an acceleration sensor. The geomagnetic sensor is an apparatus for measuring and sensing the magnitude and direction of terrestrial magnetism that cannot be sensed by a human being. In general, a fluxgate geomagnetic sensor that detects geomagnetism using a fluxgate is used. The fluxgate geomagnetic sensor uses materials having high magnetic permeability such as a permalloy as a magnetic core. The fluxgate geomagnetic sensor measures the magnitude and direction of an external magnetic field by measuring a second harmonic element that is proportional to the external field generated in a coil winding around the magnetic core. As the magnitude and direction of the external magnetic field are measured, a current azimuth angle is detected and a rotation degree may be measured accordingly. The geomagnetic sensor may comprise a 2-axis or a 3-axis fluxgate. The 2-axis fluxgate sensor is a sensor in which an X-axis fluxgate and a Y-axis fluxgate cross at right angles, and the 3-axis fluxgate sensor is a sensor in which a Z-axis fluxgate is added to an X-axis and Y-axis fluxgates.

Referring to FIG. 3, the yaw angle of the multimedia apparatus becomes an azimuth angle. The azimuth angle of the geomagnetic sensor may be determined using various operation methods. For example, the azimuth angle of the geomagnetic sensor may be determined using the follow Equation 1:

$$\Psi = \tan^{-1}(\sin \Psi / \cos \Psi) \qquad \text{[Equation 1]}$$

In Equation 1, $\Psi$ represents an azimuth angle, and $\cos \Psi$ and $\sin \Psi$ respectively represent X-axis and Y-axis fluxgate output values.

Meanwhile, the acceleration sensor refers to a sensor that senses the degree of inclination of an object using gravity acceleration, and may comprise a 2-axis or 3-axis fluxgate. If the acceleration sensor is embodied as a 2-axis sensor in which an X-axis fluxgate and a Y-axis fluxgate cross at right angles, the pitch angle and the roll angle may be calculated using the following Equation 2:

$$\psi = \sin^{-1}(a_y/g)$$

$$\theta = \sin^{-1}(a_x/g) \qquad \text{[Equation 2]}$$

In Equation 2, g represents gravity acceleration, $\psi$ represents a roll angle, $\theta$ represents a pitch angle, $a_x$ represents an X-axis acceleration sensor output value, and $a_y$ represents a Y-axis acceleration sensor output value.

As described above, disposition of the multimedia apparatus may be sensed using a 2-axis sensor, a 3-axis sensor, or other various sensors such as a 6-axis sensor. In addition, various sensors such as a geomagnetic sensor and an acceleration sensor may be used.

Figure 4A:
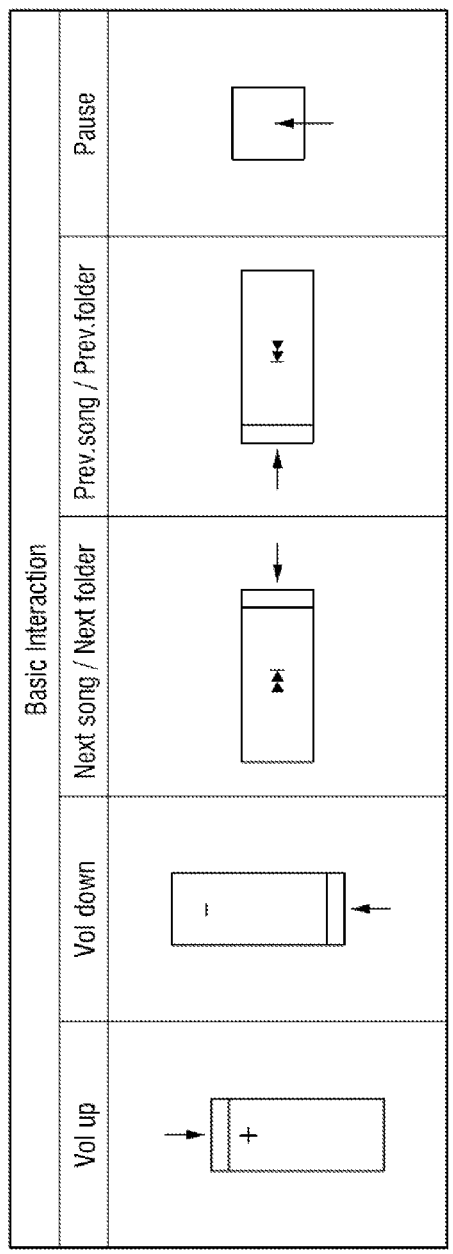

FIGS. 4A to 4B are views to explain various operations according to an exemplary embodiment of the present invention.

Referring to FIG. 4A, in an exemplary embodiment, a first reference disposition of a multimedia apparatus may be an orientation in which a user faces an LED display area including at least one icon of the multimedia apparatus.

In the first reference disposition, various orientations of the multimedia apparatus may be explained with reference to a button of the multimedia apparatus and an arrow indicating contact with the button.

First of all, if the multimedia apparatus is oriented such that a button is disposed in an upper direction (i.e., in the direction of the +Z axis) in the first reference disposition and a user presses the button, the current disposition state is sensed by a sensing unit and the multimedia apparatus may perform an operation of increasing volume.

Likewise, if a button is disposed in a lower direction (i.e., in the direction of −Z axis) in the first reference disposition and a user presses the button, the current disposition state is sensed by the sensing unit and the multimedia apparatus may perform an operation of decreasing volume.

If a button is disposed in a right direction (i.e., in the direction of +X axis) in the first reference disposition and a user presses the button one time, the multimedia apparatus may perform an operation of reproducing next multimedia data, such as a next audio file. In this case, if the user presses the button twice in a row, the multimedia apparatus may perform the operation of changing a folder with current multimedia data, that is, a storage unit to a next folder.

Likewise, if a button is disposed in a left direction (i.e., in the direction of −X axis) in the first reference disposition and a user presses the button one time, the multimedia apparatus may perform an operation of reproducing previous multimedia data, such as a previous audio file. In this case, if the user presses the button twice in a row, the multimedia apparatus may perform the operation of changing a current folder to a previous folder.

The operation of changing folders of the multimedia apparatus will be explained in more detail with reference to FIG. 7.

Meanwhile, a second reference disposition may be an orientation in which a user faces a button of the multimedia apparatus. If the user presses a button one time in the second reference disposition, the multimedia apparatus may perform a reproducing operation, and if the user presses the button twice in a row, the multimedia apparatus may perform a pausing operation.

The remaining operations will be explained with reference to FIG. 4B.

For example, if a user presses a button for more than two seconds, the multimedia apparatus may switch power on or off.

In addition, if a user shakes the multimedia apparatus, the multimedia apparatus may sequentially change from a normal play mode, to a shuffle play mode, to a fast play mode, and to a slow play mode.

In addition, if a user snaps the multimedia apparatus, the multimedia apparatus may perform an operation of providing an audio guide through an earphone that can communicate with an audio output unit of the multimedia apparatus either via a wired connection or wirelessly.

If the operation of changing a play mode of the multimedia apparatus is performed by shaking the multimedia apparatus for a prolonged period of time, the operation of providing an audio guide may be performed by shaking the multimedia apparatus for a short period of time.

Meanwhile, if a button is disposed in an upper direction (in the direction of +Z axis) in the first reference disposition and a user presses the button, the current disposition state is sensed by the sensing unit and the multimedia apparatus may perform the operation of increasing volume.

However, since no operation corresponding to a user's motion of pressing the button twice in a row while the multimedia apparatus performs the operation of increasing volume is set in the multimedia apparatus in advance, the user may map various operations corresponding to motions according to his or her preference.

For example, the multimedia apparatus may be set to map the operation of reproducing multimedia data on a play list pre-stored in a storage unit on the user's motion of pressing the button twice in a row while the multimedia apparatus performs the operation of increasing volume. The mapping information may be stored in the storage unit.

Referring to FIGS. 4A and 4B, the motion of pressing the button of the multimedia apparatus has been explained as an example. However, substantially the same operations may be performed by touching the button of the multimedia apparatus.

In addition, in FIGS. 4A and 4B, the input unit receives a user's selection signal through a single button. However, the input unit may perform the various operations by receiving a user's motion of shaking the multimedia apparatus in the first reference disposition or in the second reference disposition.

In addition, a user's selection signal may be input through a plurality of buttons. For example, the multimedia apparatus may pre-set a first operation, if there are two buttons, as a user's motion of pressing a first button and a second button sequentially, and a second operation as a user's motion of pressing the first button twice in a row, and store the set operations in the storage unit.

FIG. 5 is a view to explain operations of a display unit and an audio output unit corresponding to various operations of a multimedia apparatus according to an exemplary embodiment of the present invention.

Referring to FIG. 5, various operations of a multimedia apparatus may be displayed through various icons in an LED display area of a display unit according to various operations of the multimedia apparatus, and various operations of the multimedia apparatus may be provided as audio through an earphone which communicates with the audio output unit or the multimedia apparatus either via a wired connection or wirelessly.

Referring to FIG. 5, various operations of a display unit and an audio output unit are identified. However, a detailed description will not be provided as the operations may be understood by one of skill in the art, especially in light of the description regarding FIGS. 4A to 4B.

Figure 6A:
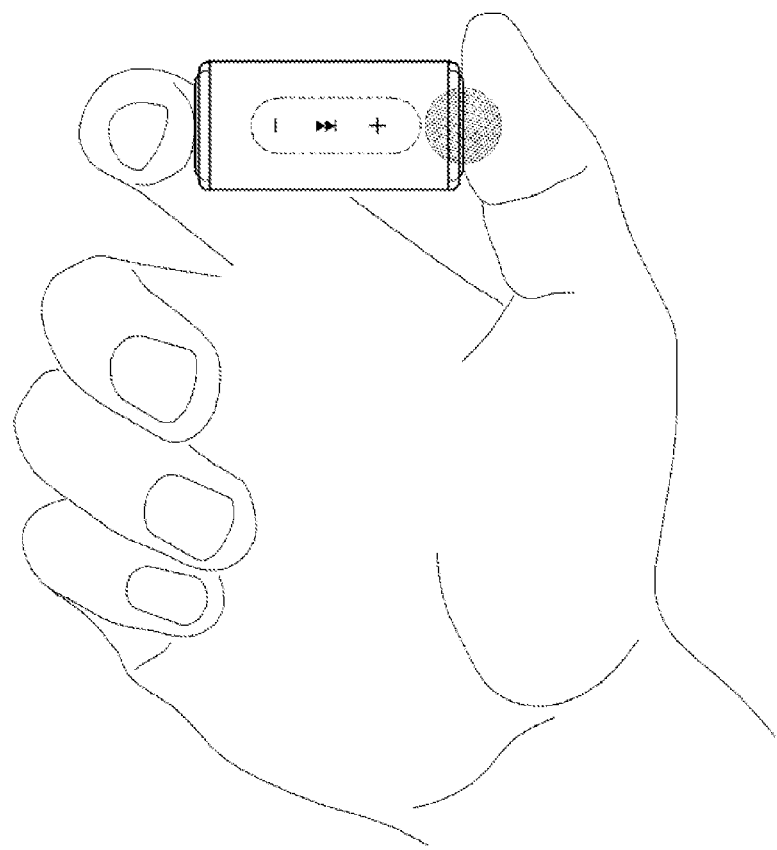
FIGS. 6A to 6B are views to explain an operation principal of a multimedia apparatus according to an exemplary embodiment of the present invention.
Figure 6B:
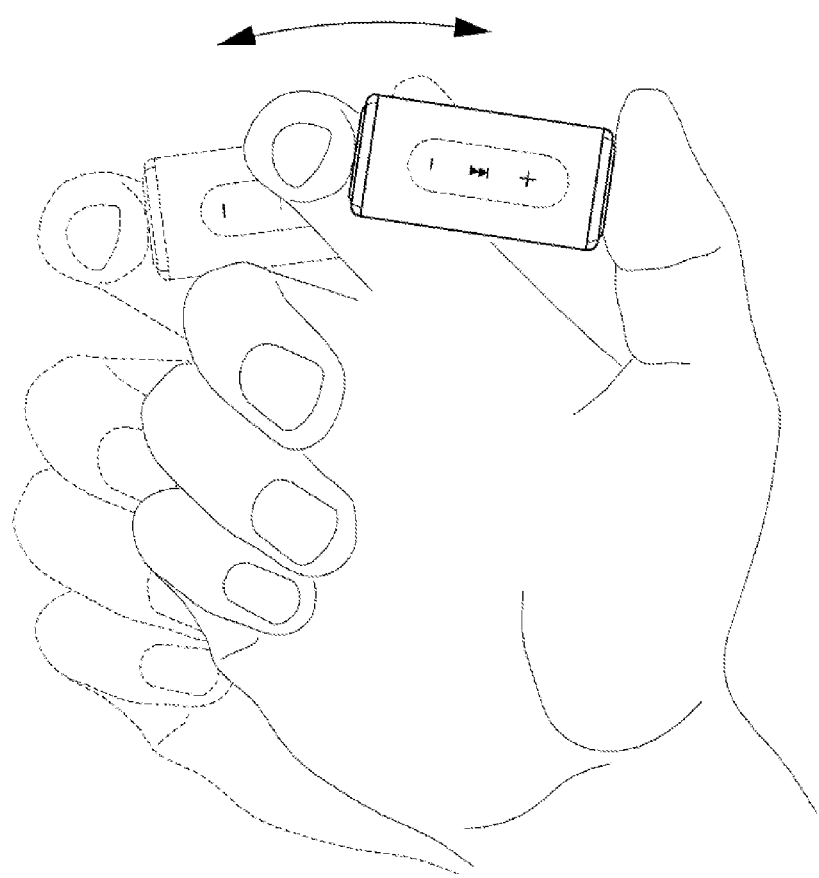

FIGS. 6A to 6B are views to explain an operation principal of a multimedia apparatus according to an exemplary embodiment of the present invention.

Referring to FIG. 6A, a multimedia apparatus may perform various operations as a user presses or touches a button of the multimedia apparatus with his or her thumb.

Referring to FIG. 6B, the multimedia apparatus may perform various operations as a user shakes the multimedia apparatus.

Figure 7:
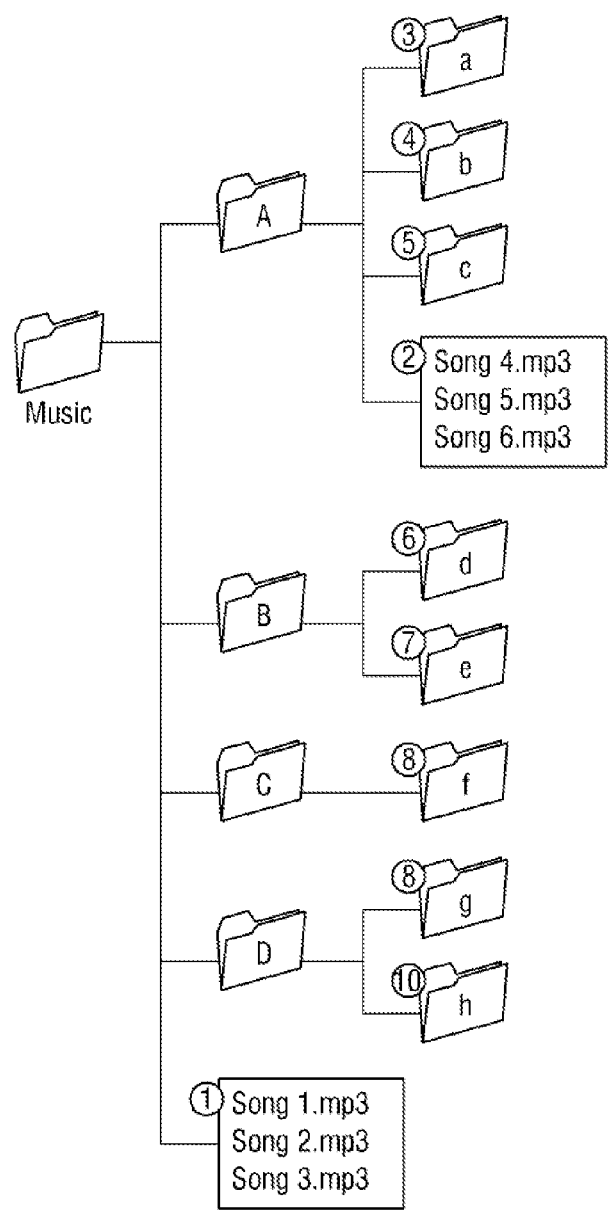
FIG. 7 is a view to explain an order of reproducing multimedia data according to an exemplary embodiment of the present invention.

FIG. 7 is a view to explain an order of reproducing multimedia data according to an exemplary embodiment of the present invention.

Referring to FIG. 7, a storage unit may include a plurality of stratified folders. It can be assumed that the upper most folder is a music folder in which audio files are stored.

When the multimedia apparatus performs an operation of reproducing multimedia, the multimedia apparatus may reproduce audio files first from among folders and audio files in an upper most music folder and then reproduce files in a next folder.

The order of reproducing audio files may be determined in various ways. For example, audio files may be reproduced in an alphabetical or numerical order.

After all audio files are reproduced, audio files in folder A may be reproduced first in an alphabetical order, and the audio files in folder A may be reproduced in the order of folder a, b, and c.

Subsequently, audio files may be reproduced in the order of folder B, C, and D.

Image files and video files may be reproduced in substantially the same way as the audio files.

The order of reproducing files may be changed arbitrarily by a user. More specifically, the order of reproducing files in the multimedia apparatus may be set or changed through an application executed by an external apparatus (not shown).

Figure 8:
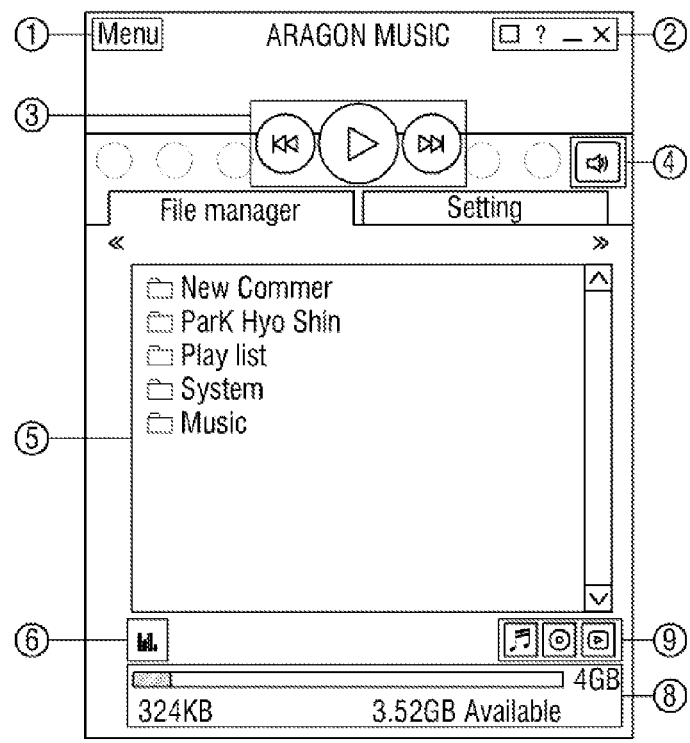
FIGS. 8 and 9 are views illustrating an example of an application of an external apparatus for setting or changing various operations of a multimedia apparatus according to an exemplary embodiment of the present invention.
Figure 9:
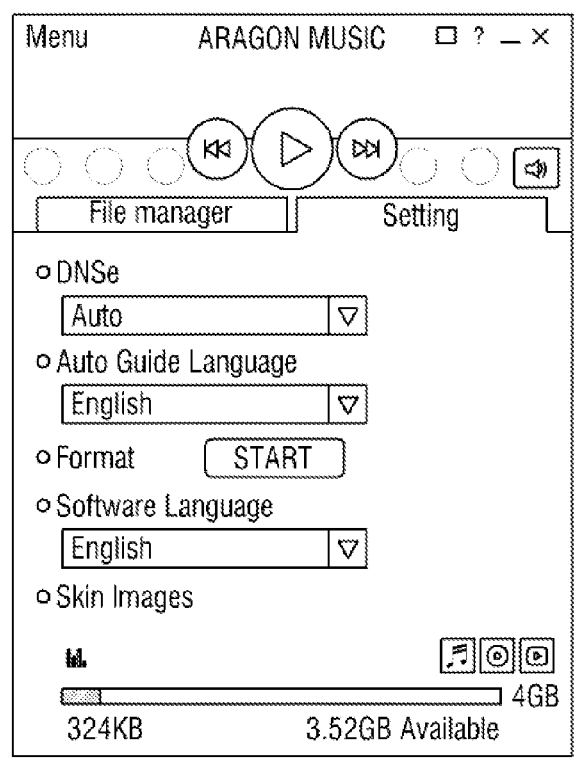

FIGS. 8 and 9 are views illustrating an example of an application of an external apparatus for setting or changing various operations of a multimedia apparatus according to an exemplary embodiment of the present invention.

Referring to FIG. 8, the operation of changing various settings of multimedia data of a multimedia apparatus or reproducing multimedia data of the multimedia apparatus in advance may be performed using an application executed by an external apparatus (such as a host PC).

For example, if the multimedia apparatus is connected to a host PC through a communication interface unit, an application stored in a storage unit may be automatically installed in the host PC. Alternatively, such an application may be installed in the host PC in advance.

Various multimedia data may be reproduced or the operation of temporary stop may be simulated using a tap item of a file manager. In addition, a tempo analysis may be simulated as illustrated in ⑥.

Referring to FIG. 9, a sound effect suitable for multimedia data being reproduced may be selected, and a language output from audio guide or a language of an application may be changed through an item of a Digital Natural Sound engine (DNSe).

Figure 10A:
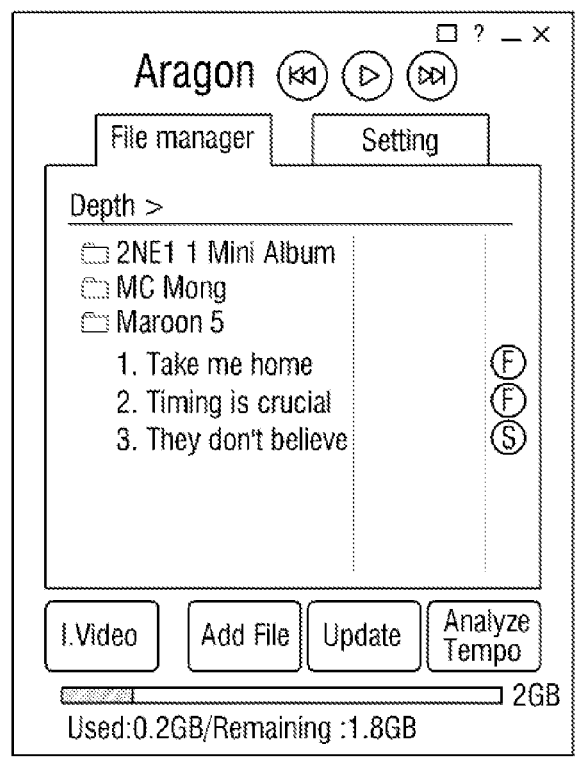
FIGS. 10A to 10B illustrate other examples of an application of an external apparatus to set or change various operations of a multimedia apparatus according to an exemplary embodiment of the present invention.
Figure 10B:
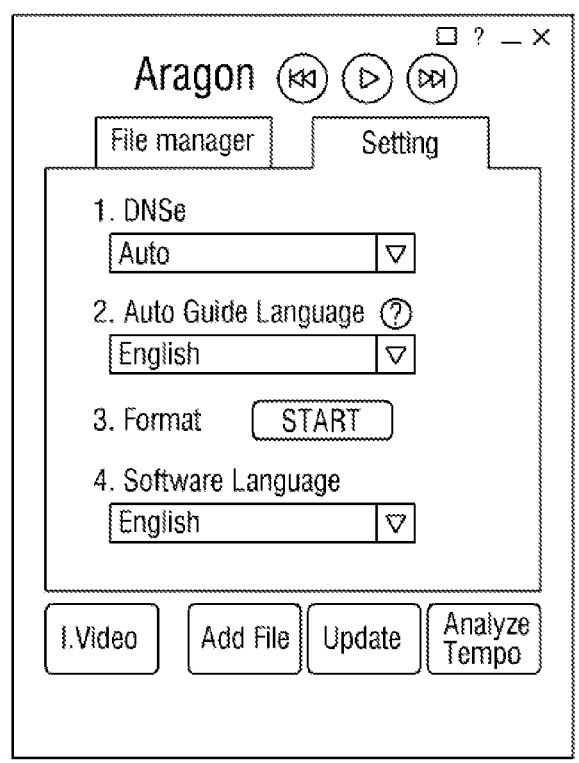

FIGS. 10A to 10B illustrate other examples of an application of an external apparatus to set or change various operations of a multimedia apparatus according to an exemplary embodiment of the present invention.

Referring to FIG. 10A, if a file manager tab is selected, various folders of the multimedia apparatus may be displayed through an application of a host PC. In this case, the capacity of each multimedia file may be illustrated as 'F' standing for 'Full' or 'S' standing for 'Small'. In addition, the capacity of a storage unit and the capacity of an empty space of the multimedia apparatus may be illustrated.

Referring to FIGS. 10A to 10B, an application of a host PC, that is, an external apparatus, may provide a button for viewing a video file, opening or updating a file, or analyzing tempo.

Figure 11A:
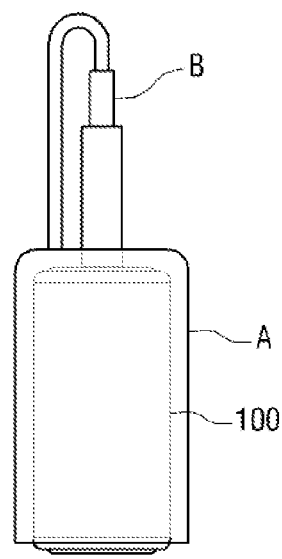
FIGS. 11A to 11C are views illustrating various exemplary implementations of a multimedia apparatus according to an exemplary embodiment of the present invention.
Figure 11B:
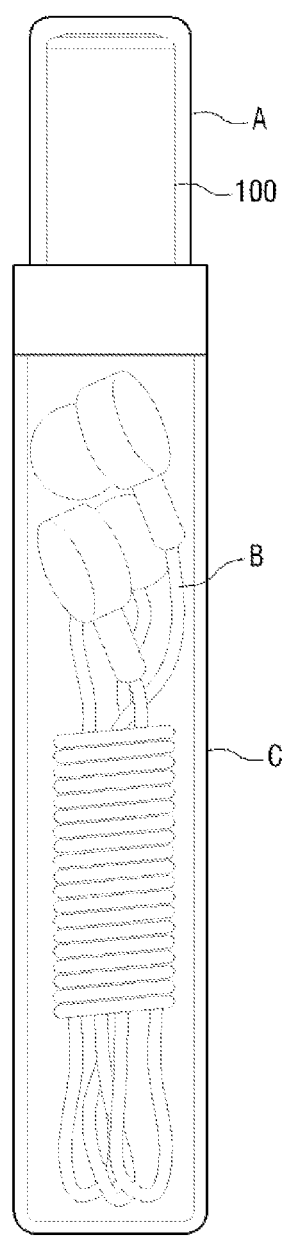
Figure 11C:
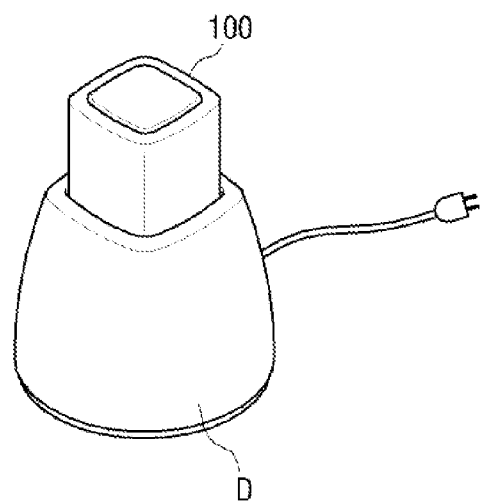

FIGS. 11A to 11C are views illustrating various exemplary embodiments of a multimedia apparatus according to an exemplary embodiment of the present invention.

Referring to FIG. 11A, a multimedia apparatus 100 may be connected to a wired earphone (B) through the communication interface unit 160. In addition, the multimedia apparatus 100 may be protected by a protection case (A) with various designs so that the multimedia apparatus 100 may be kept conveniently and also have better marketing effect.

Referring to FIG. 11B, the multimedia apparatus 100 may be protected by the protection case (A), and be kept with the wired earphone B in an earphone protection case (C).

Referring to FIG. 11C, the multimedia apparatus 100 may be charged through an exclusive or a public charger (D).

Figure 12:
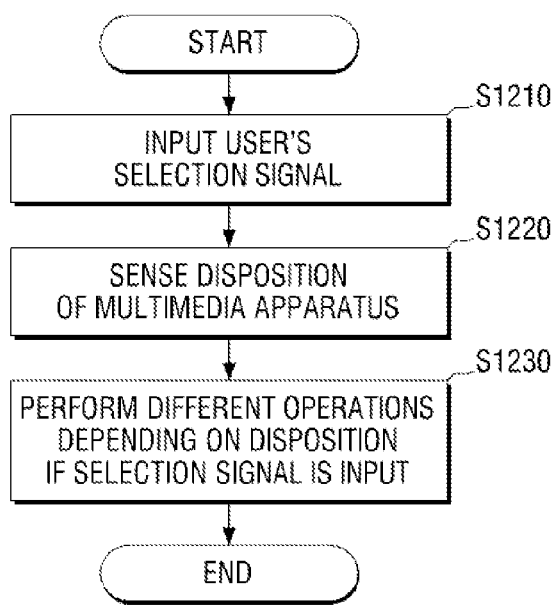
FIG. 12 is a flowchart illustrating a method for controlling an operation of a multimedia apparatus according to an exemplary embodiment of the present invention.

FIG. 12 is a flowchart illustrating a method for controlling an operation of a multimedia apparatus according to an exemplary embodiment of the present invention.

Referring to FIG. 12, the method for controlling the operation of a multimedia apparatus includes receiving a user's selection signal by an input unit in step S1210, and sensing disposition of the multimedia apparatus by a sensing unit in step S1220.

Subsequently, if a selection signal is input, a controller performs different operations depending on each disposition in step S1230.

According to the exemplary method for controlling the operation of the multimedia apparatus, if a selection signal is input by the input unit, user authentication may be performed using user identification information such as a user's finger print.

According to the exemplary method for controlling the operation of the multimedia apparatus, information regarding mapping between disposition sensed by a storage unit and an operation corresponding to each disposition may be stored prior to step S1210.

According to the exemplary method for controlling the operation of the multimedia apparatus, outputting an operation as audio through an audio output unit or an earphone of an external apparatus may be performed, and information regarding an operation state may be displayed by a display unit after step S1230. To do so, according to the exemplary method for controlling the operation of the multimedia apparatus, the multimedia apparatus may communicate with an external apparatus through a communication interface unit. Descriptions regarding overlapped parts will not be provided.

Accordingly, various operations of the multimedia apparatus may be performed by a simple manipulation.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus comprising:
   an input unit configured to receive a user command;
   a sensing unit configured to sense an orientation of the apparatus while receiving the user command; and
   a controller configured to perform different operations depending upon the orientation and an input method of the user command,
   wherein mapping information on the different operations corresponding to the orientation and the input method of the user command is pre-stored.

2. The apparatus as claimed in claim 1,
   wherein the input method of the user command is one of a button input, a user's motion of shaking the apparatus, and a motion of snapping the apparatus, and
   wherein the user command according to the button input is determined based on at least one of a button input time and the number of button inputs.

3. The apparatus as claimed in claim 1, wherein the different operations comprise at least one of controlling power, controlling a play or a stop, controlling a volume, controlling a change in a play list, controlling a play mode, controlling a change of a folder, and controlling a setting.

4. The apparatus as claimed in claim 1, wherein the orientation is determined by a pitch angle, a roll angle, and an azimuth angle of the apparatus sensed by the sensing unit.

5. The apparatus as claimed in claim 1, further comprising:
   a storage unit configured to store the mapping information,
   wherein the mapping information is changeable by a user, and
   wherein the mapping information changed by the user is stored in the storage unit.

6. The apparatus as claimed in claim 1, further comprising:
   an audio output unit configured to output a voice corresponding to the different operations.

7. The apparatus as claimed in claim 1, further comprising:
   a communication interface unit configured to:
   perform wired or wireless communication with an external apparatus, and
   transmit data for outputting the different operations as at least one of an audio signal and a video signal to an earphone that communicates with the apparatus.

8. The apparatus as claimed in claim 1, further comprising:
an authentication unit configured to authenticate whether a user is an authorized user by using user identification information, if the user command is received.

9. A method of controlling an apparatus, the method comprising:
receiving a user command;
sensing an orientation of the apparatus while receiving the user command; and
performing different operations depending upon the orientation and an input method of the user command,
wherein mapping information on the different operations corresponding to the orientation and the input method of the user command is pre-stored.

10. The method as claimed in claim 9, wherein the input method of the user command is one of a button input, a user's motion of shaking the apparatus, and a motion of snapping the apparatus, and
wherein the user command according to the button input is determined based on at least one of a button input time and the number of button inputs.

11. The method as claimed in claim 9, wherein the different operations comprise at least one of controlling power, controlling a play or a stop, controlling a volume, controlling a change in a play list, controlling a play mode, controlling a change of a folder, and controlling a setting.

12. The method as claimed in claim 9, wherein the orientation is determined by a pitch angle, a roll angle, and an azimuth angle of the apparatus sensed by the sensing unit.

13. The method as claimed in claim 9, wherein the mapping information is changeable by a user,
the method further comprising:
storing the mapping information changed by the user.

14. The method as claimed in claim 9, further comprising:
outputting a voice corresponding to the different operations.

15. The method as claimed in claim 9, further comprising:
performing wired or wireless communication with an external apparatus and for transmitting data for outputting the different operations as at least one of an audio signal and a video signal to an earphone that communicates with the apparatus.

16. The method as claimed in claim 9, further comprising:
authenticating whether a user is an authorized user by using user identification information if the user command is received.

\* \* \* \* \*